United States Patent [19]
Derbyshire et al.

[11] Patent Number: 6,057,262
[45] Date of Patent: May 2, 2000

[54] ACTIVATED CARBON AND PROCESS FOR MAKING SAME

[75] Inventors: Francis J. Derbyshire; Marit Jagtoyen, both of Lexington, Ky.

[73] Assignee: University of Kentucky Research Foundation, Lexington, Ky.

[21] Appl. No.: 09/088,297

[22] Filed: Jun. 1, 1998

Related U.S. Application Data

[63] Continuation-in-part of application No. 08/772,951, Dec. 24, 1996, abandoned, which is a continuation of application No. 08/446,096, May 19, 1995, abandoned.

[51] Int. Cl.⁷ .................................................. C01B 31/12
[52] U.S. Cl. ............................................ 502/423; 502/426
[58] Field of Search .......................... 201/35; 423/445 R; 502/423, 424, 425, 426

[56] References Cited

U.S. PATENT DOCUMENTS

| | | |
|---|---|---|
| 3,864,277 | 2/1975 | Kovach . |
| 3,901,823 | 8/1975 | Dimitri et al. . |
| 4,425,256 | 1/1984 | Pilipski . |
| 4,528,281 | 7/1985 | Sutt, Jr. . |
| 4,531,953 | 7/1985 | Groose et al. . |
| 4,699,896 | 10/1987 | Sing et al. .............................. 502/423 |
| 4,742,040 | 5/1988 | Ohsaki et al. . |
| 4,857,243 | 8/1989 | Von Blücher et al. . |
| 4,954,469 | 9/1990 | Robinson . |
| 5,102,855 | 4/1992 | Greinke . |
| 5,113,856 | 5/1992 | Van Der Smissen . |
| 5,162,286 | 11/1992 | MacDowall . |
| 5,202,302 | 4/1993 | Dela Pena et al. . |
| 5,204,310 | 4/1993 | Tolles et al. . |
| 5,304,527 | 4/1994 | Dimitri .................................... 502/416 |

FOREIGN PATENT DOCUMENTS 0311364 of 1989 European Pat. Off. .

*Primary Examiner*—Steven P. Griffin
*Assistant Examiner*—Stuart L. Hendrickson
*Attorney, Agent, or Firm*—King & Schickli, PLLC

[57] ABSTRACT

A process is described for the manufacture of activated carbon in the form of a powder, as granules or as extrudates. The process includes treating a biomass feedstock, such as woods, coconut shells, fruit pits, peats, lignites and all ranks of coal with a processing agent and an activation agent. The processing agent may be a natural or synthetic monomer, oligomer, polymer or mixtures thereof capable of interacting or co-polymerizing with the biomass feedstock. The activation agent may be, for example, phosphoric acid, zinc chloride or mixtures thereof. A high surface area, high hardness extruded activated carbon may be produced by this process. The activated carbon is generally characterized by a BET surface area between 600–2500 $m^2/g$, a mesopore surface area between 80–900 $m^2/g$ and for extruded or granular carbons, a Takeda hardness of between 10–50%.

13 Claims, No Drawings

ACTIVATED CARBON AND PROCESS FOR MAKING SAME

This is a continuation-in-part of U.S. Patent Application Ser. No. 08/772,951, filed Dec. 24, 1996 which is a continuation of U.S. patent application Ser. No. 08/446,096, filed May 19, 1995, both now abandoned.

TECHNICAL FIELD

The present invention relates generally to activated carbons and processes for preparing the same.

BACKGROUND OF THE INVENTION

Activated or adsorbent carbons are solid adsorbents with extremely high internal surface areas. They are produced from a range of carbonaceous starting materials and by different processing routes, and are used in applications that involve purification and chemical recovery. For example, activated carbons may be utilized in various applications to treat waste water, to recover solvents from process streams, to purify air and gases, to reduce gasoline vapor emissions and in gold recovery. Activated carbons may also be utilized in more specialized applications in many instances by the addition of impregnants. For example, impregnated activated carbons are utilized in catalysis, medicine and as purification agents in military and industrial gas masks.

The pore structure of an activated carbon determines its capacity to adsorb molecules of different shapes and sizes. Microporous carbons (i.e. carbons in which the majority of the pores have diameters less than 2 nm) are most effective for the adsorption of small molecules while mesopore carbons (i.e. carbons in which a large proportion of pores have diameters in the range 2–50 nm) are used for the adsorption of large molecules such as color bodies. As carbon surfaces are generally hydrophobic, they are not ideally suited for the adsorption of polar compounds, such as for the removal of phenol from water. The introduction of surface functionalities can, however, enhance the attraction for such molecules. Accordingly, it should be appreciated that the ability to control pore structure and surface chemistry unlocks the door to the utilization of activated carbons in many more technologies and applications involving adsorption, separation and catalysis.

Mechanical strength can also be an important property, especially for granular carbons. More specifically, the carbons must allow handling such as necessary to deliver and pack absorber beds with the generation of a minimal number of fines. More specifically, in many applications the carbon is subjected to repeated movement and must bear the overburden of material when packed in deep beds. For example, in hydrocarbon vapor recovery systems known as evaporative loss control devices (ELCD's), the activated carbon first adsorbs hydrocarbons from an air/vapor stream. Once the adsorption capacity of the activated carbon is reached, the carbon is regenerated under vacuum with the passage of purge air. In contrast, in industrial processes such as polymer processing, regeneration of the carbon may be achieved by steam stripping. The hydrocarbons are then recovered from the effluent condensed stream. Under any such operating conditions (i.e. possibly pressure, temperature, and flow changes), high hardness and low friability (e.g. for dust control) are important properties. Consequently, it should be appreciated that many applications require the activated carbons to have a minimum strength.

Activated carbons in the form of granules, extrudates, powders, fibers or beads, can be produced from suitable thermosetting precursors by either thermal or chemical routes. Common commercial feedstocks include biomass material such as wood, coconut shell and fruit pits, and fossilized plant matter such as peats, lignites and all ranks of coal. The thermal route involves carbonization to about 600–650° C., followed by partial gasification (activation) in steam or carbon dioxide at 800–900° C. to develop the desired pore structure. Chemical activation involves reaction with a reagent such as zinc chloride or phosphoric acid followed by heat treatment to temperatures in the range 400–900° C. An important additional step is leaching to recover residual reagent for eventual recycle.

While the properties of activated carbons are influenced to some extent by the processing route and conditions, the precursor structure is the single most determinant factor. Attempts to modify the porosity or surface chemistry of activated carbons have involved the reaction of the as-formed carbon with agents that can lead either to the deposition of carbon (i.e to narrow the pore dimensions), or the introduction of surface functionalities (i.e. to enhance the attraction of certain molecules to the activated carbons). In either case, the attainment of an uniform distribution is difficult and complicated by restricted access and diffusion of the reactant through the pore structure. The underlying premise of the present invention is that the porosity and surface chemistry of the carbons are defamed and controlled in the synthesis process.

SUMMARY OF THE INVENTION

It is a primary object of the present invention to provide a relatively simple and efficient process for the manufacture of activated carbons.

Another object of the present invention is to provide an efficient and effective process for the manufacture of activated carbons that allows one to substantially tune the physical and chemical properties of the activated carbons to meet the needs of a particular use or application.

Yet another object of the present invention is to provide relatively high surface area, relatively high hardness activated carbons, characterized by a BET surface area of up to approximately 2500 $m^2/g$, a mesopore surface area of up to 900 $m^2/g$ and a Takeda hardness of up to approximately 50%. Advantageously, such activated carbons are particularly useful in applications requiring high adsorption activity and increased hardness and low friability to allow, for example, regeneration.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an improved process is provided for the manufacture of activated carbon. The process comprises the steps of treating a biomass feedstock selected from a group consisting of wood, nut shell, fruit pit and stone, fossilized plant matter (e.g. peat, lignite, and subbituminous coal) and mixtures thereof with a processing agent selected from a group including natural and synthetic monomers, oligomers, polymers and mixtures thereof capable of interacting with the biomass feedstock in the presence of an activation agent selected from a group consisting of phosphoric acid, zinc chloride, other metal chlorides such as $CuCl_2 \cdot 2H_2O$, $NH_4Cl$, KCl, $CdCl_2 \cdot 2H_2O$, inorganic acids like sulfuric acid and hydrochloric acid, boric acid, boric acid mixed with metal chlorides like NaCl, LiCl, KCl, RbCl, ScCl, $ZnCl_2$, $AlCl_3$, $NH_4Cl$, mixtures of $AlC_3$ with $ZnCl_2$ and $NH_4Cl$, sodium phosphates like $NaH_2PO_4 \cdot 2H_2O$, and mixtures thereof, $Na_2HPO_4 \cdot 2H_2O$ $Na_3PO_4 \cdot 12H_2O$, bases like KOH, NaOH.

The treated biomass feedstock may then be preheated to a temperature of between substantially 70–200° C. for a period of 15–120 minutes in order to allow the processing agent to penetrate the precursor structure. Next, the treated biomass feedstock is heated in an inert atmosphere to a temperature of at least 350° C. for a time period sufficient to produce an activated carbon material from the biomass feedstock. This is followed by the leaching of the activated carbon material with a leaching reagent until reaching a pH 6–7 and the drying of the activated carbon material.

Preferably, the natural and synthetic monomers or polymers utilized as processing agents have a backbone that is either aliphatic or contains closed rings (1 or more 4,5 or 6—membered rings), one or more of the rings may contain heteroatoms (0, N, S). The processing agents contain functional groups such as: sulfonic, sulfinic, sulfenic and carboxylic acids, anhydrides, esters, acid halides, amides, hydrazides, imides, amidines, nitrites, aldehydes, ketones, alcohols, phenols, thiols, hydroperoxides, amines, imines, hydrazines, ethers, sulfides, and peroxides. Generally, monomers or polymers containing functional groups that are phenolic OH, alcohol or acetate lead to decreased pore size, while polymers containing carboxylic functional groups lead to increased pore size.

In particular, the additives will include monomers that contain nitrogen and sulfur functional groups since this provides a means to alter the surface chemistry of the product carbons. The carbons with high nitrogen contents have been found to have high catalytic activity. Such products are, for example, useful as catalysts for the low-temperature conversion of $SO_2$ to $H_2SO_4$. Still more particularly, the processing agent is selected from a group consisting of lignin, furfuryl acetate, furftiryl alcohol, adipic acid, 1,4,5,8-naphthalene tetracarboxylic acid hydrate, 2-quinoline, 2-hydroxy quinoline, 2,3-dihydroxy pyridine, 2-hydroxy-dibenzofuran, 2,6-pyridinedicarboxylic acid, terephthalic acid, resorcinol, o-cresol, benzoic acid, benzenetetracarboxylic acid, humic acid, dibasic acid and mixtures thereof.

In accordance with a further aspect of the present invention, the treating/reacting step includes first mixing the biomass feedstock with the processing agent and/or activation agent for approximately 10–120 minutes alone or in, for example, water. Where only the processing agent or activation agent is initially mixed with the biomass feedstock this mixing is followed by adding the other of the processing agent or activation agent to the biomass feedstock mixture and mixing again for between 15–120 additional minutes to further allow penetration of the biomass feedstock. A third approach is to add part of the activating agent to the biomass feedstock and mix for 10–90 minutes and add the other part of the activating agent to the processing agent and mix these for 10–90 minutes, then add the two mixes together and mix for another 10–90 minutes. Specifically, this time is necessary to allow the processing agent and activation agent to penetrate the structure of the feedstock. Preferably, the weight ratio of activation agent to processing agent to biomass feedstock is between 0.2:0.1:1 to 4:1:1. The method also includes the additional step of preheating the treated biomass feedstock to a temperature of between 70–200° C. for a period of between 15–120 minutes. This is then followed by the heating of the treated biomass feedstock to a temperature of between 350–650° C. for a period of 30–120 minutes.

Where the activated carbon product is to be pelleted or extruded, the biomass feedstock may be initially ground to, for example, −50 to −200 mesh. After mixing with both the processing and activation agents, the treated biomass feedstock is extruded to prepare continuous strands of product that may be broken into shorter lengths for handling. These extrudates are then subjected to the preheating, heating, leaching and drying steps previously described to provide the desired product.

Finally, further describing the process, the atmosphere utilized during processing is preferably an inert atmosphere such as nitrogen, or optionally steam, air, or using no forced gas flow. Further the leaching reagent is preferably distilled water and the drying may be completed under vacuum at a temperature of between 85–140° C.

In accordance with yet another aspect of the present invention, an activated carbon is prepared in which the dominant pore structure is either mesoporous or microporous. Broad ranges for powdered carbons produced at 450° C. are micropore volumes from 0.29–0.62 cc/g and mesopore volumes from 0.11–1.08 cc/g. Broad ranges for extruded carbons produced at 350° C. are micropore volumes from 0.42–0.74 cc/g, mesopore volumes from 0.08–0.63 cc/g. The Takeda hardness of these range from 1–50%. Further modification of the pore size distribution can be achieved by varying the process parameters, such as the ratio of biomass feedstock to processing agent to activating agent, heat treatment temperature, and gas atmosphere.

Specifically, the activated carbon is characterized by a BET surface area of between substantially 600–2500 $m^2/g$, a mesopore surface area of between substantially 80–900 $m^2/g$ and a Takeda hardness of between substantially 10–50%. More specifically, the activated carbon is characterized by a BET surface area of between substantially 1450–1950 $m^2/g$, a mesopore surface area of between substantially 250–900 $m^2/g$ and a Takeda hardness of between substantially 20–40%. Still more preferably, the activated carbon is characterized by BET surface area of between substantially 1400–1950 $m^2/g$, a mesopore surface area of between substantially 600–900 $m^2/g$ and a Takeda hardness of between substantially 20–40%.

Advantageously, one can tailor the carbon to have high micropore volume (and high surface area) and high hardness for gas phase adsorption or high mesopore volume and moderate hardness for liquid phase adsorption in addition to modified chemical composition and surface chemistry in either case. Further, such an activated carbon provides a relatively high pore surface area for increased adsorption activity while also retaining a relatively high hardness. Relatively low friability is also a characteristic. As a result, the activated carbon is particularly adapted to withstand regeneration and is capable of use in applications requiring cycling between adsorption and regeneration cycles. To the knowledge of the inventors, no previously available activated carbon has combined pores of such size and distribution for enhanced adsorption activity with such a high hardness to withstand processing conditions and allow regeneration. Thus, the present invention represents a significant advance in the art.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

DETAILED DESCRIPTION OF THE INVENTION

As briefly described above the present invention relates to a process for the manufacture of activated carbon. The process involves a step of treating/reacting a biomass feedstock with one or more processing agents and/or one or more activation agents. The biomass feedstock may comprise, for example, wood, coconut shell, fruit pit, fossilized plant matter, such as peat, lignite and all subbituminous coals as well as any mixtures thereof. Preferably, however, lignocellulosic precursors are utilized.

The processing agent is selected from a group including natural and synthetic monomers, oligomers, polymers and mixtures thereof capable of interacting or co-polymerizing with the biomass feedstock to thereby alter the course of porosity development. Monomers that contain nitrogen and sulfur functional groups (e.g. sulfonic, sulfinic, sulfenic, and carboxylic acids, anhydrides, esters, acid halides, amides, hydrazides, imides, amidines, nitriles, aldehydes, ketones, alcohols, phenols, thiols, hydroperoxides, amines, imines, hydrazines, ethers, sulfides, and peroxides) are particularly useful in altering the surface chemistry of the activated carbons produced in accordance with the present method. Specifically, activated carbons with high nitrogen contents demonstrate high catalytic activity in, for example, the conversion of $SO_2$ to $H_2SO_4$ as well as the adsorption of NO.

Monomers containing hydroxy functional groups are particularly adapted to copolymerize with cellulose and lignin in the presence of phosphoric acid. Monomers containing hydroxy groups tend to promote a reduction in the pore size of the resulting activated carbon while also increasing carbon hardness.

Monomers that contain carboxylic acid functional groups are also particularly adapted to copolymerize with the cellulose and lignin in wood in the presence of the activation agent to provide a carbon pore structure with wider pores then carbons generally derived from wood. Accordingly, it should be appreciated that the present process is particularly suited to allow one to tune the physical and chemical properties of the activated carbon so that the activated carbon is better suited for a particular, selected application or use.

Processing agents particularly useful in the present process include, but are not limited to, lignin, furfuryl acetate, furfuryl alcohol, adipic acid, 1,4,5, 8-naphthalene tetracarboxylic acid hydrate, 2-quinoline, 2-hydroxy quinoline, 2,3-dihydroxy pyridine, 2-hydroxy-dibenzofuran, 2,6-pyridinedicarboxylic acid, terephthalic acid, resorcinol, o-cresol, benzoic acid, benzenetetra carboxylic acid, humic acid, dibasic acid and mixtures thereof.

Various activation agents may be utilized in the present invention. The preferred agents are, however, selected from a group consisting of phosphoric acid, zinc chloride, other metal chlorides such as $CuCl_2 \cdot 2H_2O$, $NH_4Cl$, KCl, $CdCl_2 2H_2O$, inorganic acids like sulfuric acid and hydrochloric acid, boric acid, boric acid mixed with metal chlorides like NaCl, LiCl, KCl, RbCl, ScCl, $ZnCl_2$, $AlCl_3$, $NH_4Cl$, mixtures of $AlCl_3$ with $ZnCl_2$ and $NH_4Cl$, sodium phosphates like $NaH_2PO_4 \cdot 2H_2O$, and mixtures thereof, $Na_2HPO_4 \cdot 2H_2O$ $Na_3PO_4 \cdot 12H_2O$ and bases like KOH, NaOH.

More specifically, describing the treating/reacting step, the biomass feedstock, in a form of a powder, is first mixed together in a reactor (e.g. stainless steel vessel) with the processing agent and/or the activation agent with or without distilled water for approximately 10–120 minutes. Where only one of the activation and processing agent is initially mixed with the biomass feedstock this step may be followed by adding the other of the processing agent and activation agent to the mixture. The treated biomass feedstock is then mixed again at, for example, room temperature for 15–120 minutes to allow the activation agent and processing agent to penetrate the biomass feedstock. Next is the heating of the treated biomass feedstock to a temperature of at least 350° C. for a time period sufficient to produce an activated carbon material from the biomass feedstock. Preferably the heating occurs in an inert atmosphere of flowing nitrogen although it should be appreciated that other suitable inert gases known to those skilled in the art or even partially reactive gases such as steam or air in low concentrations may be utilized.

Still more preferably, there is an initial preheating step. More specifically, the treated biomass feedstock is heated at a rate of substantially 1.0–100.0° C./min and more preferably 2° C./min to a temperature of between 70–200° C. and held at that temperature for a period of between 15–120 minutes. This preheating is then followed by the step of heating the treated biomass feedstock to a temperature of between 350–650° C. for a period of 30–120 minutes. This heating may be completed at a rate of, for example, 15° C./min.

Following heating is the leaching of the activated carbon material with a leaching reagent such as distilled water in accordance with any appropriate leaching procedure known in the art. More specifically, the resulting activated carbon may be removed from the reaction vessel and placed in a filter. Distilled water may then be passed through the activated carbon held in the filter until the leachate reaches a pH 6–7. This is then followed by the drying of the activated carbon material. Preferably, drying is completed by placing the activated carbon in a drying vessel, establishing a low level vacuum in the drying vessel and maintaining the temperature of the activated carbon in the vessel at approximately 110° C. It should be appreciated, however, that any other appropriate drying method known in the art may be utilized.

Where an extruded activated carbon is desired, the biomass feedstock is originally ground to, for example, −50 to −200 mesh. The ground biomass feedstock is then mixed with the processing and activation agents in the manner described above. Next, the treated biomass feedstock is extruded to prepare continuous strands that may be broken or cut for handling, or shaped in some other manner known to those skilled in the art. After temperature stabilization, such as by drying overnight at 45° C. under continuous airflow, the extrudates are carbonized. An alternative processing route is to eliminate the overnight stabilization and use airflow during the preheating step to stabilize the pellets before subsequent carbonization in nitrogen atmosphere. Then the leaching and drying steps are also completed to provide the desired extruded activated carbon end product.

As should be appreciated from the description, this invention consists of mixing a biomass feedstock and processing agent and activation agent to produce a chemically activated carbon with modified pore structure and other properties. The type and extent of modification to the pore structure depends upon the starting material, nature and concentration of the processing agent and activation agent, order of mixture with the biomass feedstock and the processing conditions. The resulting chemically activated carbons may be in the form of either granules, powders or extrudates. During the preheating step, depolymerization of the processing agent (if it is polymeric) and the biomass feedstock occurs also accompanied by dehydration of the biomass feedstock. This is followed by repolymerization at the higher heat treatment temperature during which the structure of the resulting activated carbon is established: that is the structure tends to dilate and porosity is developed.

Specifically, activated carbons may be prepared that are characterized by a BET surface area of between substantially 600–2500 $m^2/g$, a mesopore surface area of between substantially 80–900 $m^2/g$ and a Takeda hardness of between substantially 10–50%. More specifically, the activated carbons may be characterized by a BET surface area of between substantially 1450–1950 $m^2/g$, a mesopore surface area of between substantially 250–900 $m^2/g$ and a Takeda hardness of between substantially 20–40%. Still more preferably, the activated carbons may be characterized by a BET surface area of between substantially 1400–1950 $m^2/g$, a mesopore surface area of between substantially 600–900 $m^2/g$ and a Takeda hardness of between substantially 20–40%.

The following examples are presented to further illustrate the invention, that is not to be considered as limited thereto. The activated carbons prepared in the examples are characterized by a Takeda hardness test as described in "Test procedures for activated carbon, Takeda Chemical Industries Ltd. (Japan), 1973". The BET surface area is determined by adsorption of nitrogen at 77K and mesopore surface area by the BJH method (described in E. P. Barrett, L. C. Joyner and P. H. Halenda, J. Amer. Chem. Soc., 73, 1951, 373.). The micropore volume is determined by the DR equation (as described in Dubinin, M. M. Zaverina, E. D. and Raduskevich, *L. V. Zh. Fiz. Khimii*, 1351–1362, 1947). The total pore volume is determined from the nitrogen adsorption data, the mesopore volume is determined by the difference between total pore volume and the micropore volume.

EXAMPLE 1

24 g white oak flour (biomass feedstock) was mixed with 77 grams of water and 42.4 g of phosphoric acid for one hour in a reaction vessel. The treated white oak flour was then heated at 2° C./min to 85° C. and kept at 85° C. for one hour. The reaction temperature was then increased to 450° C. and maintained at that level for one hour. The resulting activated carbon was characterized by the following properties:

BET surface area=1465 $m^2/g$ mesopore surface area=718 $m^2/g$ micropore volume=0.48 cc/g mesopore volume=0.72 cc/g macropore volume=0.66 cc/g Ratio micro: mesopore volume=0.67

EXAMPLE 2

20 g white oak flour (biomass feedstock) was mixed with 77 grams of water and 4.0 grams of 1,4,5,8-naphthalene-tetracarboxylic acid hydrate for one hour in a reaction vessel. 42.4 g of phosphoric acid was then, added to the reaction vessel and mixed with the white oak flour and the 1,4,5,8-naphthalene-tetracarboxylic acid hydrate for 30 minutes. The treated white oak flour was then heated at 2° C./min to 85° C. and kept at 85° C. for one hour. The reaction temperature was then increased to 450° C. and maintained at that level for one hour. The resulting activated carbon was characterized by the following properties:

BET surface area=1795 $m^2/g$ mesopore surface area=731 $m^2/g$ micropore volume=0.62 cc/g mesopore volume=0.94 cc/g macropore volume=0.94 cc/g Ratio micro: mesopore volume=0.66

EXAMPLE 3

10 g white oak flour (biomass feedstock) was mixed with 38.8 grams of water and 2.0 grams of 2,6-pyridine dicarboxylic acid for one hour in a reaction vessel. 21.2 g of phosphoric acid was then added to the reaction vessel and mixed with the white oak flour and 2,6-pyridine dicarboxylic acid for 30 minutes. The treated white oak flour was then heated at 2° C./min to 85° C. and kept at 85° C. for one hour. The reaction temperature was then increased to 450° C. and maintained at that level for one hour. The resulting activated carbon was characterized by the following properties:

BET surface area=1144 $m^2/g$ mesopore surface area=320 $m^2/g$ micropore volume=0.43 mesopore volume=0.87

Ratio micro: mesopores=0.49

EXAMPLE 4

10 g white oak flour (biomass feedstock) was mixed with 38.8 grams of water and 2.0 grams of terephthalic acid for one hour in a reaction vessel. 21.2 g of phosphoric acid was then added to the reaction vessel and mixed with the white oak flour and terephthalic acid for 30 minutes. The treated white oak flour was then heated at 2° C./min to 85° C. and kept at 85° C. for one hour (temperature range can be between 70 and 200° C.). The reaction temperature was then heated to 450° C. (temperature range can be between 350–650° C.) and maintained at that level for one hour. The resulting activated carbon was characterized by the following properties:

BET surface area=1596 $m^2/g$ mesopore surface area=701 $m^2/g$ micropore volume=0.51 cc/g mesopore volume=0.86 cc/g Ratio micro: mesopores=0.59

EXAMPLE 5

10 g white oak flour (biomass feedstock) was mixed with 38.8 grams of water and 2.0 grams of 2-hydroxyquinoline for one hour in a reaction vessel. 21.2 g of phosphoric acid was then added to the reaction vessel and mixed with the white oak flour and 2-hydroxyquinoline for 30 minutes. The treated white oak flour was then heated at 2° C./min to 85° C. and kept at 85° C. for one hour. The reaction temperature was then increased to 450° C. and maintained at that level for one hour. The resulting activated carbon was characterized by the following properties:

BET surface area=662 $m^2/g$ mesopore surface area=87 $m^2/g$ micropore volume=0.29 cc/g mesopore volume=0.11 cc/g macropore volume=0.24 cc/g Ratio micro: mesopores=2.6

EXAMPLE 6

20 g white oak flour (biomass feedstock) was mixed with 77 grams of water and 4.0 grains of 2,3-dihydroxypyridine for one hour in a reaction vessel. 42.4 g of phosphoric acid was then added to the reaction vessel and mixed with the white oak flour and the 2,3-dihydroxypyridine for 30 minutes. The treated white oak flour was then heated at 2° C./min to 85° C. and kept at 85° C. for one hour. The reaction temperature was then increased to 450° C. and maintained at that level for one hour. The resulting activated carbon was characterized by the following properties:

BET surface area=11 16 m$^2$/g mesopore surface area=211 m$^2$/g micropore volume=0.37 cc/g mesopore volume=0.30 cc/g macropore volume=0.28 cc/g Ratio micro: mesopore volume=1.2

EXAMPLE 7

20 g white oak flour (biomass feedstock) was mixed with 77 grams of water and 4.0 grams of resorcinol for one hour in a reaction vessel. 42.4 g of phosphoric acid was then added to the reaction vessel and mixed with the white oak flour and resorcinol for 30 minutes. The treated white oak flour was then heated at 2° C./min to 85° C. and kept at 85° C. for one hour. The reaction temperature was then increased to 450° C. and maintained at that level for one hour. The resulting activated carbon was characterized by the following properties:

BET surface area=1683 m$^2$/g mesopore surface area=339 m$^2$/g micropore volume=0.57 cc/g mesopore volume=0.48 cc/g Ratio micro: mesopore volume=1.2

EXAMPLE 8

20 g white oak flour (biomass feedstock) was mixed with 77 grams of water and 4.0 grams of 2-hydroxydibenzofuran for one hour in a reaction vessel. 42.4 g of phosphoric acid was then added to the reaction vessel and mixed with the white oak flour and the 2-hydroxydibenzofuran for 30 minutes. The treated white oak flour was then heated at 2° C./min to 85° C. and kept at 85° C. for one hour. The reaction temperature was then increased to 450° C. and maintained at that level for one hour. The resulting activated carbon was characterized by the following properties:

BET surface area=1299 m$^2$/g mesopore surface area=258 m$^2$/g micropore volume=0.53 cc/g mesopore volume=0.59 cc/g Ratio micro: mesopore volume=.90

EXAMPLE 9

20 g white oak flour (biomass feedstock) was mixed with 77 grams of water and 4.0 grains of o-cresol for one hour in a reaction vessel. 42.4 g of phosphoric acid was then added to the reaction vessel and mixed with the white oak flour and the o-cresol for 30 minutes. The treated white oak flour was then heated at 2° C./min to 85° C. and kept at 85° C. for one hour. The reaction temperature was then increased to 450° C. and maintained at that level for one hour. The resulting activated carbon was characterized by the following properties:

BET surface area=1376 m$^2$/g mesopore surface area=518 m$^2$/g micropore volume=0.46 cc/g mesopore volume=0.66 cc/g Ratio micro: mesopore volume=.70

EXAMPLE 10

20 g white oak flour (biomass feedstock) was mixed with 77 grams of water and 4.0 grams of a commercial Kraft lignin for one hour in a reaction vessel. 42.4 g of phosphoric acid was then added to the reaction vessel and mixed with the white oak flour and lignin for 30 minutes. The treated white oak flour was then heated at 2° C./min to 85° C. and kept at 85° C. for one hour. The reaction temperature was then increased to 450° C. and maintained at that level for one hour. The resulting activated carbon was characterized by the following properties:

BET surface area=1417 m$^2$/g mesopore surface area=493 m$^2$/g

EXAMPLE 11

100 grams of white oak flour (biomass feedstock) was ground to −100 mesh and mixed with 176 grams of 85% phosphoric acid at room temperature. The mixture was extruded to prepare continuous strands that were broken for handling. The extrudate was stabilized overnight at 45° C. under continuous air flow. The strands were then carbonized in a nitrogen purged tube furnace which was temperature programmed from ambient to 170° C. at 15° C./min, dwelling for 90 minutes, then up to 350° C. at 15° C./minute with a 60 minute dwell at the maximum temperature. After cooling, the product was extensively water washed to pH=6, to recover excess phosphoric acid, and then dried. The resulting activated carbon was characterized by the following properties:

BET surface area=2141 m$^2$/g mesopore surface area=373 m$^2$/g micropore volume=0.69 cc/g Mesopore volume=0.56 cc/g Macropore volume=0.08 cc/g Takeda hardness=2%

Apparent density=0.62 g/cc

EXAMPLE 12

85 grains of white oak flour (biomass feedstock) was ground to −100 mesh and mixed with 15 grains of a commercial Kraft lignin. 176 grams of 85% phosphoric acid was added to and mixed with the white oak and lignin at room temperature for 30 minutes. The mixture was extruded to prepare continuous strands that were broken for handling. The extrudate was stabilized overnight at 45° C. under continuous air flow. The strands were then carbonized in a nitrogen purged tube furnace which was temperature programmed from ambient to 170° C. at 1 5° C./min, dwelling for 90 minutes, then up to 350° C. at 15° C./minute with a 60 minute dwell at the maximum temperature. After cooling, the product was extensively water washed to pH=6, to recover excess phosphoric acid, and then dried. The resulting activated carbon was characterized by the following properties:

BET surface area=1267 m²/g mesopore surface area=194 m²/g

Micropore volume=0.45 cc/g

Mesopore volume=0.33 cc/g

Takeda hardness=44%

EXAMPLE 13

80 grams of white oak flour (biomass feedstock) was ground to −100 mesh and mixed with 20 grams of a commercial Kraft lignin. 176 grams of 85% phosphoric acid was added to and mixed with the white oak and lignin at room temperature for 30 minutes. The mixture was extruded to prepare continuous strands that were broken for handling. The extrudate was stabilized overnight at 45° C. under continuous air flow. The strands were then carbonized in a nitrogen purged tube furnace which was temperature programmed from ambient to 1 70° C. at 1 5° C./min, dwelling for 90 minutes, then up to 350° C. at 15° C./minute with a 60 minute dwell at the maximum temperature. After cooling, the product was extensively water washed to pH=6, to recover excess phosphoric acid, and then dried. The resulting activated carbon was characterized by the following properties:

BET surface area=956 m²/g mesopore surface area=40 m²/g

Micropore volume=0.42 cc/g

Mesopore volume=0.08 cc/g

Macropore volume=0.03 cc/g

Takeda hardness=30%

Apparent density=1.28 g/cc

EXAMPLE 14

80 grams of white oak flour (biomass feedstock) was ground to −100 mesh and mixed with 20 grams of 85% phosphoric acid for 30 minutes. At the same time 20 grams of a commercial Kraft lignin was mixed with 88 grams of 85% phosphoric acid for 30 minutes. The two mixtures of wood and acid and lignin and acid were blended and mixed for another 30 minutes. The mixture was extruded to prepare continuous strands that were broken for handling. The strands were then carbonized in a tube furnace which was temperature programmed from ambient to 95° C. at 15° C./min, dwelling for 60 minutes in an atmosphere of air, then up to 350° C. at 15° C./minute in a nitrogen atmosphere with a 60 minute dwell at the maximum temperature. After cooling, the product was extensively water washed to pH=6, to recover excess phosphoric acid, and then dried. The resulting activated carbon was characterized by the following properties:

BET surface area=1305 M²/g

Micropore volume=0.49 cc/g

Mesopore volume=0.08 cc/g

Takeda hardness=50%

EXAMPLE 15

80 grams of white oak flour (biomass feedstock) was ground to −100 mesh and mixed with 20 grams of furfuryl acetate. 176 grams of 85% phosphoric acid was added to and mixed with the white oak and fiirftrryl acetate at room temperature for 30 minutes. The mixture was extruded to prepare continuous strands that were broken for handling. The extrudate was stabilized overnight at 45° C. under continuous air flow. The strands were then carbonized in a nitrogen purged tube fuirnace which was temperature programmed from ambient to 170° C. at 15° C./min, dwelling for 90 minutes, then up to 350° C. at 15° C./minute with a 60 minute dwell at the maximum temperature. After cooling the product was extensively water washed to pH=6, to recover excess phosphoric acid, and then dried. The resulting activated carbon was characterized by the following properties:

BET surface area 1573 m²/g mesopore surface area=534 m²/g Micropore volume=0.67 cc/g Mesopore volume 0.57 cc/g Macropore volume=0.16 cc/g Takeda hardness=44%

Apparent density=0.63 cc/g

EXAMPLE 16

80 grains of white oak flour (biomass feedstock) was ground to −100 mesh and mixed with 20 grams of fiirfiiryl alcohol. 176 grams of 85% phosphoric acid was added to and mixed with the white oak and furfuryl alcohol at room temperature for 30 minutes. The mixture was extruded to prepare continuous strands that were broken for handling. The extrudate was stabilized overnight at 45° C. under continuous air flow. The strands were then carbonized in a nitrogen purged tube furnace which was temperature programmed from ambient to 170° C. at 15° C./min, dwelling for 90 minutes, then up to 350° C. at 15° C./minute with a 60 minute dwell at the maximum temperature. After cooling, the product was extensively water washed to pH=6, to recover excess phosphoric acid, and then dried. The resulting activated carbon was characterized by the following properties:

BET surface area 1338 m²/g mesopore surface area=437 m²/g

Micropore volume=0.48 ccg

Mesopore volume=0.63 cc/g

Macropore volume=0.08 cc/g

Takeda hardness=34%

Apparent density=0.68 cc/g

EXAMPLE 17

85 grams of white oak flour (biomass feedstock) was ground to −100 mesh and mixed with 15 grams of adipic acid. 176 grams of 85% phosphoric acid was added to and mixed with the white oak and adipic acid at room temperature for 30 minutes. The mixture was extruded to prepare continuous strands that may be broken for handling. The extrudate was stabilized overnight at 45° C. under continuous air flow. The strands were then carbonized in a nitrogen purged tube furnace which was temperature programmed from ambient to 170° C. at 15° C./minute, dwelling for 90, then up to 350° C. at with a 60 minute dwell at the maximum temperature. After cooling, the product was extensively water washed to pH=6, to recover excess phosphoric acid, and then dried. The resulting activated carbon was characterized by the following properties:

BET surface area=936 m²/g mesopore surface area=115 m²/g

Micropore volume=0.51 cc/g

Mesopore volume=0.14 cc/g

Takeda hardness=40%

EXAMPLE 18

85 grams of white oak flour (biomass feedstock) was ground to −100 mesh and mixed with 15 grams of 2-hydroxydibenzofuran. 176 grams of 85% phosphoric acid was added to and mixed with the white oak and 2-hydroxydibenzoftiran at room temperature for 30 minutes. The mixture was extruded to prepare continuous strands that may be broken for handling. The extrudate was stabilized overnight at 45° C. under continuous air flow. The strands were then carbonized in a nitrogen purged tube furnace which was temperature programmed from ambient to 170° C. at 15° C./min, dwelling for 90 minutes, then up to 350° C. at 15° C./minute with a 60 minute dwell at the maximum temperature. After cooling, the product was extensively water washed to pH=6, to recover excess phosphoric acid, and then dried. The resulting activated carbon was characterized by the following properties:

BET surface area=1373 $m^2/g$ mesopore surface area=147 $m^2/g$ micropore volume=0.47 cc/g Mesopore volume=0. 11 cc/g Takeda hardness=14%

EXAMPLE 19

Four grams of benzoic acid were mixed with 77 grams of water, 42.4 grams of 85% phosphoric acid and 20 grams of white oak powder at room temperature for 1 hour. This was followed by heat treating in nitrogen at 85° C. for 1 hour and activation at 450° C. for 1 hour in nitrogen. The sample was then leached with water to a pH of 7 to remove any phosphoric acid. The resulting activated carbon was characterized by the following properties:

BET Surface Area=1571 $m^2/g$

Total Pore Volume=1.53 cclg

BJH (mesopore surface area)=764 $m^2/g$

Mesopore Volume=0.82 cc/g

EXAMPLE 20

3 grams of adipic acid was mixed with 3 grams of theraphalic acid, 77 grams of water, 42.4 grams of 85% phosphoric acid and 18 grams of white oak powder at room temperature for 1 hour. This was followed by heat treating at 85° C. for 1 hour in nitrogen and activation at 450° C. for 1 hour in nitrogen. The sample was leached with water to remove any phosphoric acid. The resulting activated carbon was characterized by the following properties:

BET Surface Area=1536 $m^2/g$

Total Pore Volume=1.41 cc/g

BJH (mesopore surface area)=715 $m^2/g$

Mesopore Volume=1.00 cc/g

EXAMPLE 21

4 grains of dibasic acid was mixed with 77 grams of water, 42.4 grams of 85% phosphoric acid and 20 grams of white oak powder at room temperature for 1 hour. This was followed by heat treating at 85° C. in nitrogen for 1 hour and activation at 450° C. for 1 hour in nitrogen. The sample was then leached with water to remove any phosphoric acid. The resulting activated carbon was characterized by the following properties:

BET Surface Area=1526 $m^2/g$

Total Pore Volume=1.43 cc/g

BJH (mesopore surface area)=707 $m^2/g$

Mesopore Volume=0.99 cc/g

EXAMPLE 22

4 grams of benzenetetracarboxylic acid was mixed with 77 grams of water, 42.4 grams of 85% phosphoric acid and 20 grams of white oak powder at room temperature for I hour. This was followed by heat treating at 85° C. for 1 hour and activation at 450° C. for I hour in nitrogen. The sample was then leached with water to remove any phosphoric acid. The resulting activated carbon was characterized by the following properties:

BET Surface Area=1849 $m^2/g$

Total Pore Volume=1.85 cc/g

BJH (mesopore surface area)=710 $m^2/g$

Mesopore Volume=1.23 cc/g

Table 2 below clearly indicates how benzoic acid, adipic acid/ therephalic acid, dibasic acid and benzenetetracarboxylic acid increased the porosity of the resulting activated carbon and how hiumic acid increases the hardness of the resulting activated carbon.

TABLE 2

Additives that increase porosity

| Additive | Additive (wt %) | Tot Pore Vol. (cc/g) | Mesopore Vol. (cc/g) | BJH SA ($m^2/g$) | BET SA ($m^2/g$) |
|---|---|---|---|---|---|
| none | — | 1.20 | 0.82 | 718 | 1466 |
| benzoic acid | 16.7% | 1.53 | 1.11 | 764 | 1571 |
| adipic acid/ terephthalic acid | 33% | 1.41 | 1.00 | 715 | 1536 |
| dibasic acid | 16.7% | 1.43 | 0.99 | 707 | 1526 |
| benzenetetracarboxylic acid | 16.7% | 1.85 | 1.23 | 710 | 1849 |

Additives that increase hardness

| | Takeda Hardness (%) | Surface Area ($m^2/g$) |
|---|---|---|
| none | 1 | 1466 |
| humic acid 16.7 | 6 | 1421 |

EXAMPLE 23

The purpose of this Example is to provide a direct comparison of an activated carbon product prepared in accordance with the present invention verses an activated carbon product prepared in accordance with the method described in prior art U.S. Pat. No. 5,162,286 to MacDowall.

A first sample of activated carbon was prepared in accordance with the MacDowall method from a naturally occurring biomass feedstock high in lignin by reacting that feedstock exclusively with an activation agent. No other additive or processing agent was utilized in accordance with the MacDowall method. As a result, the porous structure of the activated carbon was exclusively the product of the chemical make-up of the starting biomass feedstock and its reaction with the activation agent.

In accordance with the teachings of the MacDowall patent, 5.0 g of olive stones were ground into particles having a mean particle size less than 70 μm. The olive stone particles were then mixed in a mechanical mixer with 8.24 g of 85% phosphoric acid and 2.2 g of water at room temperature for 25 minutes. The acid to olive stone particle weight ratio was 1.4:1. The treated olive stone particles were then heat treated at 120° C. for 20 minutes and subsequently subjected to carbonization at 450° C. in a nitrogen atmosphere for 20 minutes. The resulting activated carbon was then washed to recover any residual acid and dried before analysis of the surface area. The results of that analysis are tabulated in Table 1 under "MacDowall" activated carbon product.

In accordance with the teachings of the present invention as set forth in this document, 5.0 g of olive stones were ground into a mean particle size of less that 70 μm. The olive stone particles were then mixed in a mechanical mixer with 1 g of benzene tetracarboxylic acid processing agent at room temperature for 10 minutes. Next, the particles treated with the processing agent were mixed with 9.89 g of phosphoric acid (to provide an acid precursor ratio of 1.4:1 as specifically taught by MacDowall for purposes of direct comparison) and 2.7 g of water for 25 minutes at room temperature. The mixture was then heat treated at 120° C. for 20 minutes. The mixture was then subjected to carbonization at 450° C. in a nitrogen atmosphere for 20 minutes. The resulting granular activated carbon was then washed to recover residual acid and dried for analysis of the surface area. The results of that analysis are presented in Table 1 under the heading "Activated Carbon Product No. 1 of the Present Invention".

In an additional experiment all the parameters were identical to those set forth above for the processing of the Activated Carbon Product No. 1 of the present invention except that 1 g of sulfonic acid hydrate is substituted for 1 g of benzene tetracarboxylic acid in the process. The surface and analysis of the resulting activated carbon is shown in Table 1 under the heading "Activated Carbon Product No. 2 of the Present Invention."

TABLE 1

|  | BET Surface Area | Total Pore Volume | BJR (Mesopore Surface Area) | Mesopore Volume |
| --- | --- | --- | --- | --- |
| MacDowall | 677 m²/g | 0.54 cc/g | 160 m²/g | 0.28 cc/g |
| Activated Carbon Product No. 1 of Present Invention | 1542 m²/g | 1.35 cc/g | 383 m²/g | 0.76 cc/g |
| Activated Carbon Product No. 2 of Present Invention | 1673 m²/g | 1.23 cc/g | 300 m²/g | 0.54 cc/g |

When utilizing the most preferred parameters set out in the MacDowall patent, i.e. olive stones, phosphoric acid, a 1.4:1 acid to olive stone particle ratio and mechanical mixing, an activated carbon is produced with a BET surface area of 677 m²/g, a total pore volume of 0.54 cc/g, a BJH (mesopore surface area) of 160 m²/g and a mesopore volume of 0.28 cc/g. In sharp contrast an activated carbon produced in accordance with the present method utilizing benzene tetracarboxylic acid or sulfonic acid hydrate as a processing agent is characterized by a BET surface area, respectively, of 1542 and 1673 m²/g, a total pore volume of 1.35 and 1.23 cc/g, a BJH (mesopore surface area of 3836 and 300 m²/g and a mesopore volume of 0.76 and 0.54 cc/g. Thus, the BET surface area of the activated carbon product of the present invention has been experimentally shown to be increased by at least 2.27 times and as much as 2.47 times the BET surface area of the activated carbon product produced by the prior art MacDowall method. The BJH (mesopore surface area) of the activated carbon product of the present method is increased by at least 1.87 times and as much as 2.39 times the BJH (mesopore surface area) of the activated carbon product produced by the MacDowall method. The mesopore volume of the activated carbon product of the present method is increased by at least 1.92 times and as much as 2.7 times the mesopore volume of the activated carbon product of the MacDowall method. These are significant improvements of the activated carbon product and represent significant developments in the preparation of an activated carbon that is more efficient and effective for many of its potential applications.

EXAMPLE 24

Additional activated carbons are prepared by substituting zinc chloride, boric acid, a metal halide or a mixture of metal halides and/or acid for the phosphoric acid in Examples 1–22. The heat treatment temperature may also be increased up to 650° C.

EXAMPLE 25

Additional activated carbons are prepared by substituting peach pits, coconut shell, peat, lignite and subbituminous coal for the white oak flour.

EXAMPLE 26

Additional activated carbons are prepared by substituting the processing agents with any synthetic monomers or polymers with a backbone that is either aliphatic or contains closed rings (1 or more 4,5 or 6 -membered rings) One or more of the rings may contain heteroatoms (O,N,S). The processing agents contain functional groups such as; sulfonic, sulfinic, sulfenic, and carboxylic acids, anhydrides, esters, acid halides, amides, hydrazides, imides, amidines, nitrites, aldehydes, ketones, alcohols, phenols, thiols, hydroperoxides, amines, imines, hydrazines, ethers, sulfides, and peroxides. Generally, monomers or polymers containing finctional groups that are phenolic OH, alcohol or acetate lead to decreased pore size, while polymers containing carboxylic finctional groups lead to increased pore size. The incorporation of S and N is for the purpose of altering surface chemistry. Table 3 provides examples of additives to powdered wood carbons.

TABLE 3

Additives to powdered wood carbons, low temperature 85° C., high temperature 450° C., ratio of phosphoric acid to precursor 1.5:1.

| Additive (Add.) | Ratio Add.:wood | Surface Area (m,g) | | Pore volume (cc/g) | | |
| --- | --- | --- | --- | --- | --- | --- |
|  |  | BET | Mesopore | Micro | Meso | Macro |
| No Add. Add. with no function at groups | — | 1465 | 718 | 0.43 | 0.72 | 0.66 |
| Quinoline Add. that give increased pore volume and wide pore size distribution | 1:4 | 1170 | 357 | 0.43 | 0.76 |  |
| 1,4,5,8-Naphthalene-tetra- | 1:4 | 1795 | 731 | 0.62 | 0.94 | 0.94 |

TABLE 3-continued

Additives to powdered wood carbons, low temperature 85° C., high temperature 450° C., ratio of phosphoric acid to precursor 1.5:1.

| Additive (Add.) | Ratio Add.:wood | Surface Area (m,g) BET | Mesopore | Pore volume (cc/g) Micro | Meso | Macro |
|---|---|---|---|---|---|---|
| carboxylic acid hydrate | | | | | | |
| 2,6-Pyridine dicarboxylic acid | 1:4 | 1144 | 320 | 0.43 | 0.87 | |
| Terephthalic acid | 1:4 | 1596 | 701 | 0.51 | 0.86 | |
| Adipic acid | 1:4 | 1470 | 660 | 0.55 | 0.77 | |
| Add. that give decreased pore volume and narrow pore size distribution | | | | | | |
| 2-hydroxycyanothane | 1:4 | 662 | 87 | 0.29 | 0.11 | 0.24 |
| 2,3-dihydroxy-pyridine | 1:4 | 1116 | 212 | 0.37 | 0.30 | 0.28 |
| 2-hydroxy-dibenzofuran | 1:4 | 1299 | 258 | 0.53 | 0.59 | |
| Resorcinol | 1:4 | 1683 | 339 | 0.57 | 0.48 | |
| o-cresol | 1:4 | 1376 | 518 | 0.46 | 0.66 | |
| Kraft tigonin | 1:4 | 1417 | 493 | | | |

Table 4 provides examples of extrudates from white oak an lignin by phosphoric acid activation.

TABLE 4

Extrudates from white oak and additives by $H_3PO_4$ activation, ratio of $H_3PO_4$ to precursor 1.5:1.

| % Add. | Density (cc/g) | Takeda Hardness (%) | Surface Area (m2/g) BET | mesopore | Pore Volume (cc/g) Micro | Meso | Macro |
|---|---|---|---|---|---|---|---|
| low temp 170° C. 0 | 0.62 | 2 | 2141 | 373 | 0.69 | 0.56 | 0.08 |
| Lignin | | | | | | | |
| 10 | | 1 | 2227 | 320 | 0.74 | 0.49 | 0.06 |
| 15 | | 44 | 1267 | 194 | 0.45 | 0.33 | |
| 20 | 1.28 | 30 | 956 | 40 | 0.42 | 0.08 | 0.03 |
| 20 repeat | 1.02 | 38 | 1285 | 126 | 0.53 | 0.22 | 0.04 |
| 20 (95° C.) | | 50 | 1305 | | 0.49 | 0.08 | |
| 20 (30° C.) | | 30 | | | | | |
| 30 | | 1 | 2113 | 185 | 0.72 | 0.41 | 0.07 |
| Furfuryl acetate 20 | 0.63 | 44 | 1573 | 534 | 0.67 | 0.57 | |
| Furfuryl alcohol 20 | 0.68 | 34 | 1338 | 437 | 0.48 | 0.63 | 0.08 |
| Adipic Acid 15 | | 40 | 936 | 115 | 0.51 | 0.14 | |
| 2,6-Pyridine dicarboxylic acid 15 | | 14 | 1156 | 180 | 0.51 | 0.44 | |
| Quirotine 15 | | 8 | 1075 | 229 | 0.42 | 0.53 | |
| 2-Hydroxydibenzofuran 15 | | 14 | 1373 | 147 | 0.47 | 0.11 | |

Table 5 provides examples of the elemental analysis of some treated activated carbons compared with an untreated activated carbon/precursor.

TABLE 5

| Additive | wt. % | C | H | N | S |
|---|---|---|---|---|---|
| none | — | 93.1 | 1.6 | 1.0 | 0.0 |
| Naplithalene tetracarboxylic acid | 20% | 91.7 | 1.4 | 1.4 | 0.0 |
| 2-hydroxy quinoline | 20% | 84.3 | 2.0 | 2.7 | 0.1 |
| Dihydroxy pyridine | 20% | 86.9 | 1.6 | 2.6 | 0.1 |

In summary, numerous benefits have been described which result from employing the concepts of the present invention. The invention comprises a simple and effective process for producing activated carbons with modified -pore structures and other unique properties. Specifically, extruded activated carbons of novel surface chemistry as well as high surface area and pore size distribution and therefore, high adsorption activity may be provided with relatively high hardness for better durability and processing allowing use in applications requiring regeneration of the activated carbon. In fact, wood derived activated carbons may be provided with a hardness up to approximately 90–95% of coal derived activated carbons.

Traditionally, activated carbons from lignocellulosic precursors give highly mesoporous carbons. The present invention allows one to narrow the pores from lignocellulosic precursors by adding lignin, pyridine or quinoline before phosphoric acid activation. Alternatively, mesoporosity and surface area may be increased by utilizing naphthalene tetracarboxylic acid prior to phosphoric acid activation.

The invention has been described herein with reference to certain preferred processing steps. However, as obvious variations thereon will become apparent to those skilled in the art, the invention is not to be considered limited thereto.

What is claimed is:

1. A process for the manufacture of activated carbon comprising:
    reacting a biomass feedstock with a processing agent in the presence of an activation agent wherein said biomass feedstock is selected from the group consisting of wood, nut shell, husk, fruit pit, peat, lignite, subbituminous coal, mixtures thereof, said processing agent is selected from the group consisting of furfrryl acetate, furfuryl alcohol, adipic acid, 1,4,5,8-naphthalene tetracarboxylic acid hydrate, quinoline, 2-hydroxy quinoline, 2,3-dihydroxy pyridine, 2-hydroxydibenzofuran, 2,6-pyridinedicarboxylic acid, terepthalic acid, resorcinol, o-cresol, benzoic acid, benzenetetracarboxylic acid, humic acid, dibasic acid and mixtures thereof and said activation agent is selected from the group consisting of phosphoric acid, metal chlorides, inorganic acids, sodium phosphates, bases and mixtures thereof;
    heating the biomass feedstock in the presence of the processing and activation agents to a temperature of at least 350° C. for a time period sufficient to produce a chemically activated carbon material from the biomass feedstock;
    leaching the activated carbon material with a leaching reagent; and
    drying the activated carbon material.

2. The process set forth in claim 1, wherein said processing agent is diverse from said biomass feedstock.

3. The process set forth in claim 1, including mixing said biomass feedstock with said processing agent prior to mixing with said activation agent.

4. The process set forth in claim 1, including mixing said biomass feedstock with said activation agent prior to mixing with said processing agent.

5. The process set forth in claim 1, wherein the weight ratio of biomass feedstock to activation agent to processing agent is between 0.2:0.1:1 to 4:1:1.

6. The process set forth in claim 1, including the additional step of preheating said biomass feedstock to a temperature of between 70–200° C. for a period of between 15–120 minutes.

7. The process set forth in claim 6, wherein said heating is to a temperature of between 350–650° C. for a period of between 30–120 minutes following preheating.

8. An activated carbon prepared in accordance with the process set forth in claim 1, further characterized by a BET surface area between 1400–1950 $m^2/g$, a mesopore surface area between 600–900 $m^2/g$ and a Takeda hardness between 20–40%.

9. A process for the manufacture of activated carbon, comprising:
    reacting a biomass feedstock with a processing agent diverse from said biomass feedstock in the presence of an activation agent wherein said biomass feedstock is selected from the group consisting of wood, nut shell, husk, fruit pit, peat, lignite, subbituminous coal, and mixtures thereof, said processing agent is selected from the group consisting of natural and synthetic monomers, oligomers, polymers and mixtures thereof all incorporating an aliphatic or aromatic backbone and a functional group selected from the group consisting of sulfonic, sulfinic, sulfenic and carboxylic acids, anhydrides, esters, acid halides, amides, hydrazides, imides, amidines, nitrites, aldehydes, ketones, alcohols, phenols, thiols, hydroperoxides, amines, imines, hydrazines, ethers, sulfides, peroxides and mixtures thereof;
    heating the biomass feedstock in the presence of the processing and activation agents to a temperature of at least 350° C. for a time period sufficient to produce a chemically activated carbon material from the biomass feedstock;
    leaching the activated carbon material with a leaching reagent; and
    drying the activated carbon material.

10. The process set forth in claim 9, including the additional step of preheating said biomass feedstock to a temperature of between 70–200° C. for a period of between 15–120 minutes.

11. The process set forth in claim 10, wherein said heating is to a temperature of between 350–650° C. for a period of between 30–120 minutes following preheating.

12. A process for the manufacture of activated carbon, comprising:
    mixing a biomass feedstock with a processing agent prior to mixing with an activation agent wherein said biomass feedstock is selected from the group consisting of wood, nut shell, husk, fruit pit, peat, lignite, subbituminous coal, and mixtures thereof, said processing agent is selected from the group consisting of natural and synthetic monomers, oligomers, polymers and mixtures thereof all incorporating an aliphatic or aromatic backbone and a functional group selected from the group consisting of sulfonic, sulfinic, sulfenic and carboxylic acids, anhydrides, esters, acid halides, amides, hydrazides, imides, amidines, nitrites, aldehydes, ketones, alcohols, phenols, thiols, hydroperoxides, amines, imines, hydrazines, ethers, sulfides, peroxides and mixtures thereof;
    heating the biomass feedstock in the presence of the processing and activation agents to a temperature of at least 350° C. for a time period sufficient to produce a chemically activated carbon material from the biomass feedstock;
    leaching the activated carbon material with a leaching reagent; and
    drying the activated carbon material.

13. A process for the manufacture of activated carbon, comprising:
    mixing a biomass feedstock with an activation agent prior to mixing with a processing agent wherein said biomass feedstock is selected from the group consisting of wood, nut shell, husk, fruit pit, peat, lignite, subbituminous coal, and mixtures thereof, said processing agent is selected from the group consisting of natural and synthetic monomers, oligomers, polymers and mixtures thereof all incorporating an aliphatic or aromatic backbone and a functional group selected from the group consisting of sulfonic, sulfinic, sulfenic and carboxylic acids, anhydrides, esters, acid halides, amides, hydrazides, imides, amidines, nitrites, aldehydes, ketones, alcohols, phenols, thiols, hydroperoxides, amines, imines, hydrazines, ethers, sulfides, peroxides and mixtures thereof;

heating the biomass feedstock in the presence of the processing and activation agents to a temperature of at least 350° C. for a time period sufficient to produce a chemically activated carbon material from the biomass feedstock;

leaching the activated carbon material with a leaching reagent; and drying the activated carbon material.

* * * * *

UNITED STATES PATENT AND TRADEMARK OFFICE
CERTIFICATE OF CORRECTION

PATENT NO : 6,057,262
DATED : May 2, 2000
INVENTOR(S) : Francis J. Derbyshire; Marit Jagtoyen It is certified that error appears in the above-identified patent and that said Letters Patent is hereby corrected as shown below:

Claim 1, Column 19, line 29, change "furfryyl" to -- furfuryl --.
Claim 9, Column 20, line 18, change "nitrites" to -- nitriles --.
Claim 12, Column 20, line 50, change "nitrites" to -- nitriles --.
Claim 13, Column 21, line 9, change "nitrites" to -- nitriles --.

Signed and Sealed this

Twentieth Day of February, 2001

NICHOLAS P. GODICI

*Attest:*

*Attesting Officer*     *Acting Director of the United States Patent and Trademark Office*